July 5, 1938. J. W. WINFORD 2,122,734
MEANS FOR TREATING TREES
Filed April 6, 1937 2 Sheets-Sheet 1

Inventor
J. W. Winford
By Clarence A. O'Brien
Hyman Berman
Attorneys

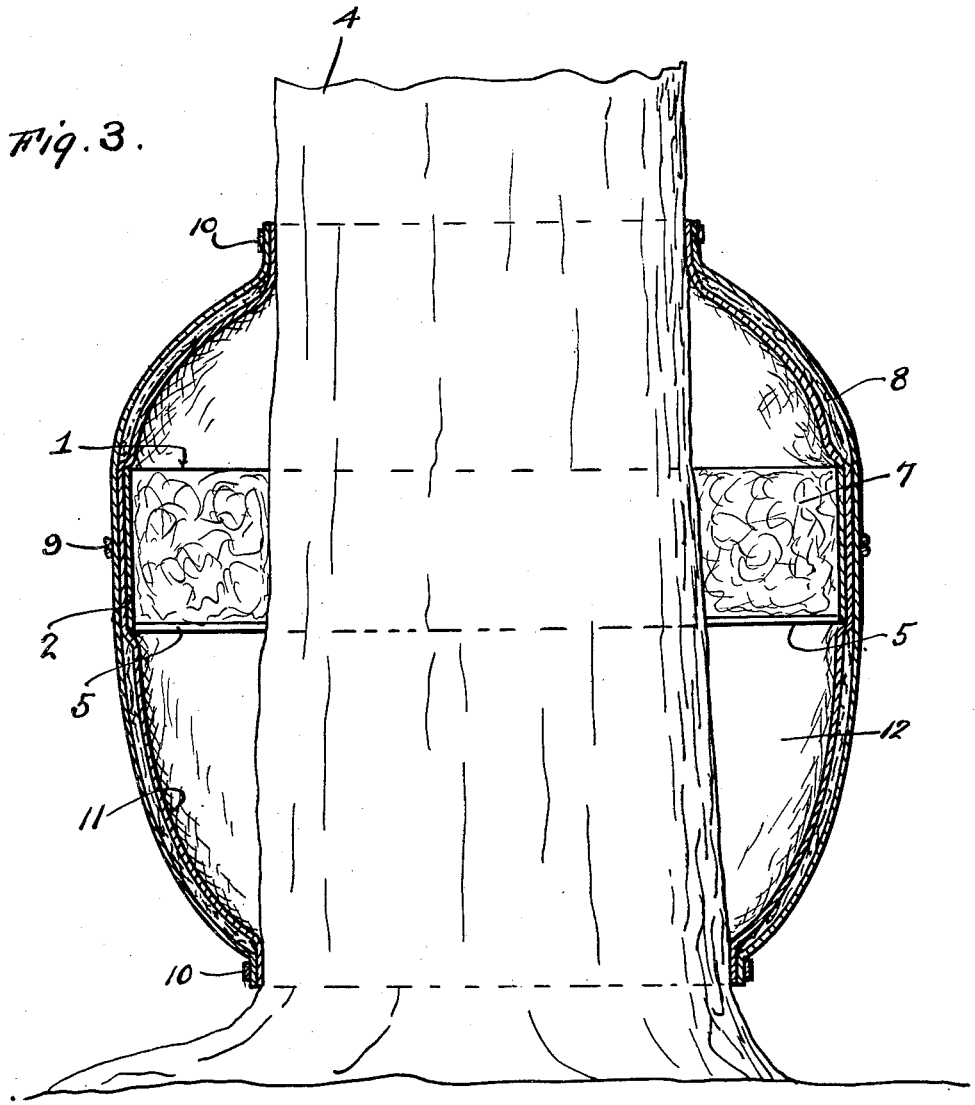

Patented July 5, 1938

2,122,734

UNITED STATES PATENT OFFICE 2,122,734

MEANS FOR TREATING TREES

John Williamson Winford, Salem, Va.

Application April 6, 1937, Serial No. 135,331

1 Claim. (Cl. 47—24)

The present invention relates to new and useful improvements in means for treating trees, particularly fruit trees, and has for its primary object to prevent premature budding by stopping the flow of sap by freezing through the use of a suitable medium, preferably "dry ice" or solidified carbon dioxide.

Another very important object of the invention is to provide a freezing apparatus or device of the character described which may be expeditiously applied to trees of various sizes within a given range.

Other objects of the invention are to provide a freezing device of the aforementioned character which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 3 is a view in vertical section through the device, showing same mounted on a tree.

Figure 1:
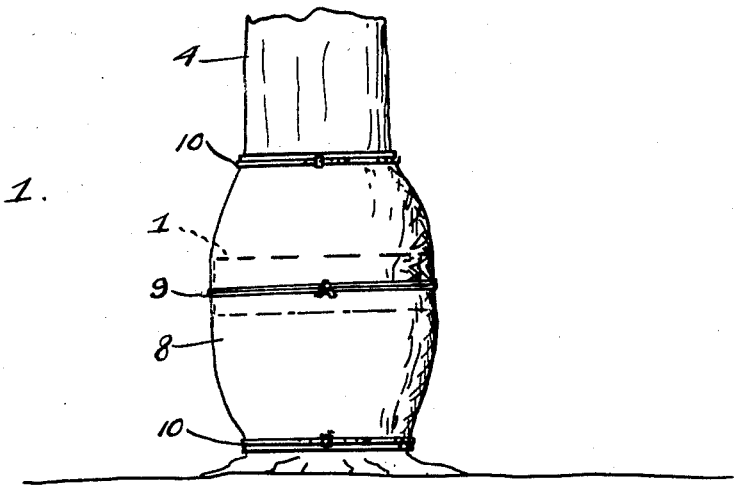
Figure 1 is an elevational view, showing a device constructed in accordance with the present invention mounted on a tree.
Figure 2:
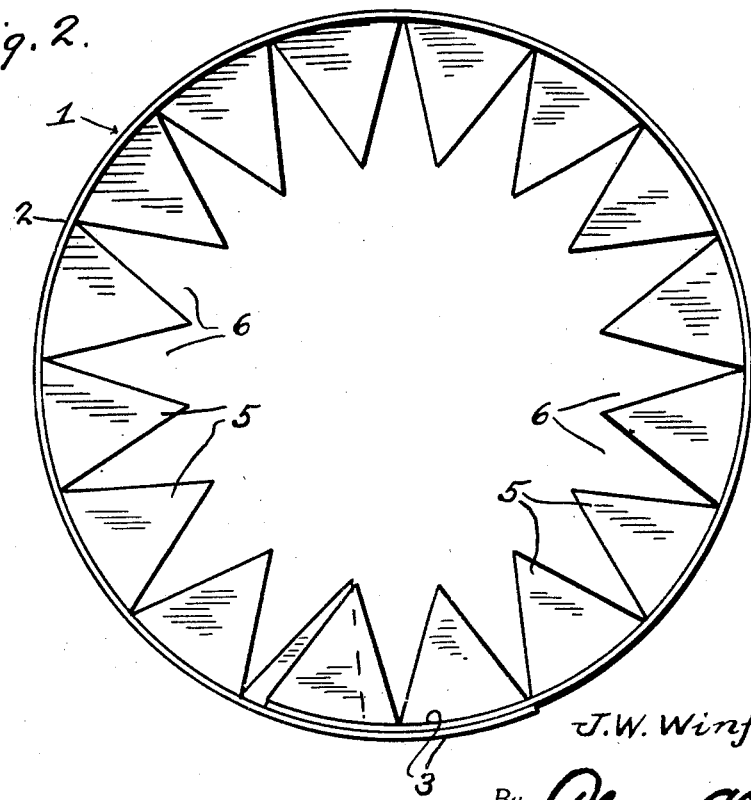
Figure 2 is a detail view in top plan of the container.

Referring now to the drawings in detail, it will be seen that the embodiment of the invention which has been illustrated comprises a container of suitable metal which is designated generally by the reference numeral 1. As illustrated to advantage in Fig. 2 of the drawings, the container 1 includes a split, resilient ring 2 having lapped end portions 3, said ring being adapted to encircle the truck 4 of a tree in spaced relation thereto at any desired height from the ground. Projecting inwardly from the bottom of the ring 2 are substantially triangular, integral prongs 5 which constitute the bottom of the container 1, said prongs being formed to define openings or passages 6. The container 1 is adapted to be filled with dry ice, as at 7.

Enclosing the container 1 and extending above and below same is a covering 8 of suitable flexible, waterproof material, such as canvas. At an intermediate point, the covering 8 is secured to the container 1 by a strand of twine 9 or other suitable material. Adjustable straps 10 secure the end portions of the covering 8 tightly around the tree trunk 4. Within the covering 8 is a heat insulating lining 11 of a length substantially the same as that of said covering and which is also secured by the elements 9 and 10. As best seen in Fig. 3 of the drawings, the construction and arrangement is such as to provide a freezing chamber 12 below the container 1.

It is thought that the operation of the device will be readily apparent from a consideration of the foregoing. The dry ice 7, of course, rests on the prongs 5 constituting the bottom of the annular container 1. Cold air from the container 1 passes downwardly through the openings 6 into the chamber 12 and freezes the outer bark of the tree thus stopping the flow of sap. The prongs 5 will bite into the bark of the tree sufficiently to hold the container 1 in position thereon but not enough to injure said tree. The split, resilient ring 2 permits the container 1 to be readily mounted on various sizes of trees within a given range.

It is thought that the many advantages of a means and method in accordance with the present invention will be readily understood and although a preferred embodiment is as illustrated and described, it is to be understood that changes may be resorted to which will fall within the scope of the invention as claimed.

What is claimed is:—

Means for treating trees comprising a split circular band of resilient spring material having substantially horizontally arranged pointed parts extending inwardly from its lower edge, the points of which are adapted to penetrate parts of the tree when the band is placed around a part of the trunk thereof, the ends of the band overlapping, said band and the pointed members forming a container for a freezing medium and a cover member, formed of waterproof and heat-insulating material having an intermediate part extending around the band and its end portions extending well below and above the band with the terminals of said end portions encircling portions of the tree trunk above and below the band, straps encircling said terminals for holding the same against said portions of the trunk and means for holding said intermediate portions of the covering member against the band.

JOHN WILLIAMSON WINFORD.